(12) United States Patent
Marquina

(10) Patent No.: US 6,805,513 B2
(45) Date of Patent: Oct. 19, 2004

(54) MECHANISM FOR REGULATING COLLAPSIBLE ELEMENTS

(75) Inventor: Miguel Marañón Marquina, Burgos (ES)

(73) Assignee: Grupo Antolin_Ingenieria, S.A. (ES)

( * ) Notice: Subject to any disclaimer, the term of this patent is extended or adjusted under 35 U.S.C. 154(b) by 130 days.

(21) Appl. No.: 09/914,902

(22) PCT Filed: Jan. 17, 2001

(86) PCT No.: PCT/ES01/00011

§ 371 (c)(1),
(2), (4) Date: Jan. 15, 2002

(87) PCT Pub. No.: WO01/53130

PCT Pub. Date: Jul. 26, 2001

(65) Prior Publication Data

US 2002/0159824 A1 Oct. 31, 2002

(30) Foreign Application Priority Data

Jan. 17, 2000 (ES) .................. PCT/ES00/00014

(51) Int. Cl.⁷ .............................................. F16D 1/12
(52) U.S. Cl. .................... 403/107; 403/92; 403/97; 403/104; 403/105; 403/106
(58) Field of Search ............................. 403/85, 92, 99, 403/101, 105–107, 112, 379.1, 374.1–374.5; 297/359.12, 364, 369, 373, 374, 376, 411.2, 411.21, 411.3, 411.32, 411.35, 411.39; 280/47.391, 47.38, 47.36

(56) References Cited

U.S. PATENT DOCUMENTS

| | | | |
|---|---|---|---|
| 4,165,901 A | | 8/1979 | Swenson |
| 4,582,445 A | * | 4/1986 | Warshawsky ................. 403/97 |
| 4,614,452 A | * | 9/1986 | Wang .......................... 403/27 |
| 5,039,118 A | * | 8/1991 | Huang .................... 280/47.371 |
| 5,069,474 A | * | 12/1991 | Tai .............................. 280/658 |
| 5,123,768 A | * | 6/1992 | Franklin ...................... 403/96 |
| 5,154,435 A | * | 10/1992 | Chiu ..................... 280/47.315 |
| 5,520,474 A | * | 5/1996 | Liu .............................. 403/97 |
| 5,765,958 A | * | 6/1998 | Lan ............................. 403/97 |
| 6,095,713 A | * | 8/2000 | Doyle et al. .................. 403/97 |
| 6,161,982 A | * | 12/2000 | Cole ........................... 403/97 |
| 6,196,568 B1 | * | 3/2001 | Stevens ................... 280/304.1 |
| 6,503,018 B2 | * | 1/2003 | Hou et al. .................... 403/97 |
| 6,565,156 B1 | * | 5/2003 | Yamashita et al. ..... 297/354.12 |

* cited by examiner

Primary Examiner—Robert J. Sandy
Assistant Examiner—Ruth C. Rodriguez
(74) Attorney, Agent, or Firm—Welsh & Katz, Ltd.

(57) ABSTRACT

The mechanism includes two discoidal parts, including a ratchet and crown mounted on an unattached axle, each of their opposing faces with cogged sections. The positioning of the ratchet on the axle allows it to move axially to facilitate the separation of the teeth. The separation of the teeth is carried out by a separator element that is set up between the ratchet and crown, the ratchet being able to be manually operated to carry out the separation. The ratchet is required to activate the position of engagement with the crown by means of a spring that is supported by an external disk that in turn presses on a limit plate pierced by the axle and mounted on the ratchet.

4 Claims, 11 Drawing Sheets

MECHANISM FOR REGULATING COLLAPSIBLE ELEMENTS

OBJECT OF THE INVENTION

The invention refers to a mechanism for regulating hinged elements, specifically planned to regulate the angle that two elements, one fixed and the other mobile, and hinged with respect to the first, form between them, being of special application in car seats armrests, without overlooking its application in other fields where the folding or angular variation of a movable item relative to another fixed were required, such as might be an car seat, the back of a seat, etc.

The mechanism is based on the use of two revolving parts, preferably discoidal, that are mounted on an axis and are cogged in their opposing faces, one of them being selected as a crown fixed to the structure or fixed item while the other forms a ratchet that is mounted on the movable or hinged element, so that the angular displacement of the hinged element causes the axial displacement of the part functioning as a ratchet with respect to the part that serves as a crown, allowing the obtaining of multiple adjustment positions corresponding to many different positions between the ratchet or crown, provided by the cogs in both parts.

It is the object of the invention to provide a mechanism based on the elements previously referred to, that allows the swinging of a movable item with regard to a fixed structure or item, and to locate the movable element stably in any angular position with regard to the fixed part, having means that the parts, from which the mechanism is constituted, tend to continuously engage with each other, as well as means that allow the separation of the cogs to reset the mechanism.

BACKGROUND TO THE INVENTION

Mechanisms have been known for regulating the angle between hinged elements in the specific case of car armrests, the adjustment of the swinging movement can be carried out in many different ways, although more widely known are two types of adjusting mechanisms, one of them based on a "infinite" screw, and another based on cogged parts, so that in the first case the adjusting is uncomfortable for the user, while in the second case the cogged parts require a precision that raise the cost of the product, , all independently of the fact that in both cases all the parts are metallic, what implies an increased weight of the mechanism assembly and, of course, a notable cost also.

DESCRIPTION OF THE INVENTION

The mechanism commended is designed to solve the previously presented difficulties, being based on the association of a series of simple parts, most of plastic, although the use of other materials is not discarded, with a simple operation without which the efficiency of the mechanism is diminished.

More specifically, the invention mechanism includes two discoidal parts or bodies mounted on an axis, and both cogged in their opposing faces, so that one of the parts functions as crown and is welded to the general structure of the fixed object or item of application, which in the case of an car armrest it will be welded to the structure of that armrest, while the other discoidal part functions as a ratchet and is capable of moving axially on the axle, between the mentioned crown and a limit formed by a plate holed through by this axle, so that the movement of the discoidal piece that functions as a ratchet is limited by this plate pierced by the axle and the crown, being supplemented with an external disk as ratchet axial support surface and as a base on which presses a spring that stretches to push this disk, and therefore the ratchet, against the crown, keeping both parts permanently engaged.

This basic system allows the obtaining of multiple adjustment positions, corresponding to the different positions possible between the ratchet and the crown, provided by the cogs of both parts, all so that the configuration of the cogs of this crown and the ratchet allows the rotation of the latter with respect to the crown in a single sense, what allows it to pass from one adjustment position to another in which the angular separation between the hinged elements is greater, but movement in a contrary sense is blocked. That is, by means of the mechanism referred to it is possible to pass directly from a less folded position to a more folded position, but it is impossible to pass from a more folded position to a less folded position.

To solve this problem it is intended to mount a separator between the ratchet and the crown that permits the axial displacement of the ratchet with respect to the crown so that disengagement takes place between the teeth of both parts, in order to allow the ratchet to be able to rotate in an unfolding sense.

Operating one way, the crown ratchet cogs impinges on a section of the each other, while the separator consists of an element placed in a side section and between both, ratchet and crown, constantly pushed against these, so that a given rotation position of the ratchet with respect to the crown implies that the separator pressed by those parts slips completely between both and separates the ratchet from the crown, which allows the contrary rotation of the rachet with respect to the crown and therefore the resetting of the mechanism.

In an alternative operation the separator consists of a discoidal part with arms that are housed in openings cut out for this purpose in the crown, so that a manual worked external part, in the shape of a wedge, that, on being suitably operated, acts on the disk separator, moving it axially so that the its arms cause the axial movement of the ratchet with respect to the crown and therefore the disengagement of its teeth to be able to reset the mechanism.

In this second case or variant of execution the whole perimeter of the crown ratchet is cogged, allowing greater stresses to be supported since these are distributed among a greater number of teeth.

In another variant or alternative operation, the adjustment is carried out automatically, without the necessity of action by external part, and the teeth are placed over the whole perimeter of the crown ratchet, thus achieving that the mechanism can support greater stresses and at the same time that the disengagement between crown and ratchet may be carried out automatically without manually actuating any part.

For that, in this alternative operation, in its face opposing the crown the ratchet has slots functioning as a slip guide for corresponding studs provided in the part that functions as a separator, consisting in this case of a ring with side arms and in those arms the studs that fit into the forementioned ratchet slots, with the distinction that the ring acting as separator is placed between the crown and the ring and its side arms located in housings intended for this effect in the corresponding crown, those housings having one of their walls shaped as a ramp to allow the sliding of the separator or ring, previously referred to, with respect to the crown, and thus to be able to bring about the pressure on the ratchet with respect to the crown to achieve the disengagement between both.

In its case, the ratchet always has, in its other face from the cogs, a slot in which a plate, preferably shaped as a crossbeam, is positioned, that limits the axial movement of this ratchet with respect to the crown, in each case counting as well with the external support disk that working with the pressure spring tends to keep the crown and ratchet together and ensure the stability of the adjustment positions between the tilting part with which the ratchet is associated and the fixed part to which the crown is attached.

Based on the characteristics previously referred to, a series of advantages and benefits are obtained among which the following can be mentioned:

- The mechanism is notably more economic that the conventional ones, since certain elements or parts (ratchet, crowns and separator) can be plastic, so that they are naturally cheaper than metallic parts.
- The mechanism assembly is much lighter when having plastic instead of metallic parts.
- The mechanism is capable of adapting to different lines of style.
- The mechanism is equally adaptable to specifications of adjustment requirements for different positions for different clients, without any investment cost.
- The mechanism is resistant to the stress demands caused by its operation.
- The mechanism is of simple structure and easily mounted, since it is only necessary to arrange on the axle the parts that form the crown, the ratchet and to pierce the limiting plate and finally to mount the support disk for the ratchet and its pressure spring.

DESCRIPTION OF THE DRAWINGS

To supplement the description that is being carried out and with purpose of helping to a better understanding of the characteristics of the invention, in accordance with a preferred example of its practical execution, it is accompanied by a set of drawings, forming an integral part of this description, in which the following, illustratively and non restrictively, has been shown.

These FIGS. 10, 10A and 10B relate to an initial position of the mechanism operation.

PREFERABLE EMBODIMENT OF THE INVENTION

As may be seen in FIGS. 1 to 6, the mechanism of the invention is constructed based on two discoidal parts (1) and (2) positioned on a common axle (3), so that the discoidal part (1) will form a ratchet and the discoidal part (2) will form a crown, this latter being welded to the general structure of the fixed item where the mechanism is to be applied such as might be the armrests of a car, while the axle (3) is unattached and the discoidal part (1) or ratchet is mounted on the hinged part, as well as having the ability of being able to move axially, after its rotation, with respect to this axle (3) and therefore with respect to the crown (2). The two discoidal parts (1) and (2) are each equipped in their opposing faces with cogged sections (4), both remaining facing each other, with the characteristic that the ratchet (1) has in a section of its perimeter a depression (5) whose function will be set out later.

As well as the ratchet (1) and the crown (2), the axle (3), passes through a disk (6) acting as a limit plate for the axial movement of the ratchet (1), and likewise above that plate or disk (6) another external disk (7) is mounted in which the ratchet (1) is supported, forming in turn a support for an axial spring (8) also arranged on the axle (3) and that presses the support disk (7) against the ratchet (1) tending to make this continuously engage with the crown (2). In a preferable operation the disk or plate (6) has the configuration of a cross that is housed in a complementary slot set up for this purpose in the upper face of the ratchet (1), as is depicted clearly in FIG. 1.

With this mechanism the operation is as follows:

To get a stable adjustment position, it is necessary only to displace the movable item (for example, the armrest of a car) until obtaining the required angular position, so that this movement causes the rotation of the ratchet (1) with respect to the crown (2), activating the teeth of both parts acting as a kind of ratchet brace, the selected position of adjustment being retained by the teeth of both parts.

If a position of greater folding is required, starting from the position last obtained, it is necessary only to displace the movable or hinged part again in the same sense, such that the teeth (4) of the ratchet (1) move again with respect to the teeth (4) of the crown (2) until reaching the new position.

If from that position a less folded position is required, it is not possible to displace the movable part in the unfolding sense, since the teeth of the ratchet collide with the teeth of the crown preventing the unfolding.

For this, a separator element has been planned able to move the ratchet axially (1) and to separate it with respect to the crown (2) producing the uncoupling or disengagement between both parts and allowing the resetting of the mechanism. For this the movable or hinged item is moved to a position of maximum folding, in which the separator (9), continuously pushed by a spring (10) or another element against the crown (2) and the ratchet (1), is inserted between both and brings about their separation, which uncoupling allows the unfolding, or what is the same, the resetting of the mechanism. Next, the movable or hinged item can again be moved, in a folding sense, to the position of adjustment required.

That is, to pass from a less folded position to one more folded, it is simply necessary to continue hinged the movable or hinged item until reaching the new position, while to obtain a less folded position it is necessary to reset the mechanism, for which the separator (9) referred to is used.

In the manner of operation depicted in FIGS. 1 to 6, this separator (9) is activated automatically by being constantly pushed by the spring or another similar element (10) against the mechanism, the ratchet incorporating a depression (5) that allows the introduction of the separator (9) when the ratchet is in the fully folded position.

Figure 1:
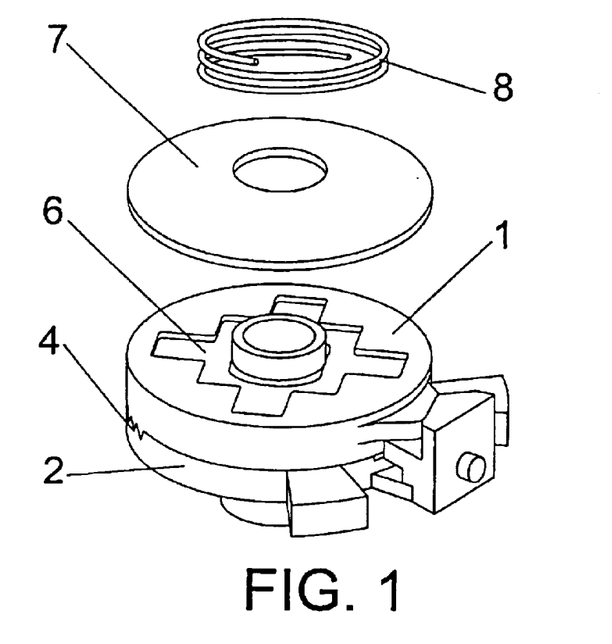
FIG. 1.—Shows a perspective representation of the mechanism of the invention with a blow-up of the support disk and spring ends, allowing the limit plate situated between the part that acts as ratchet and the part that acts as crown to be seen.
Figure 2:
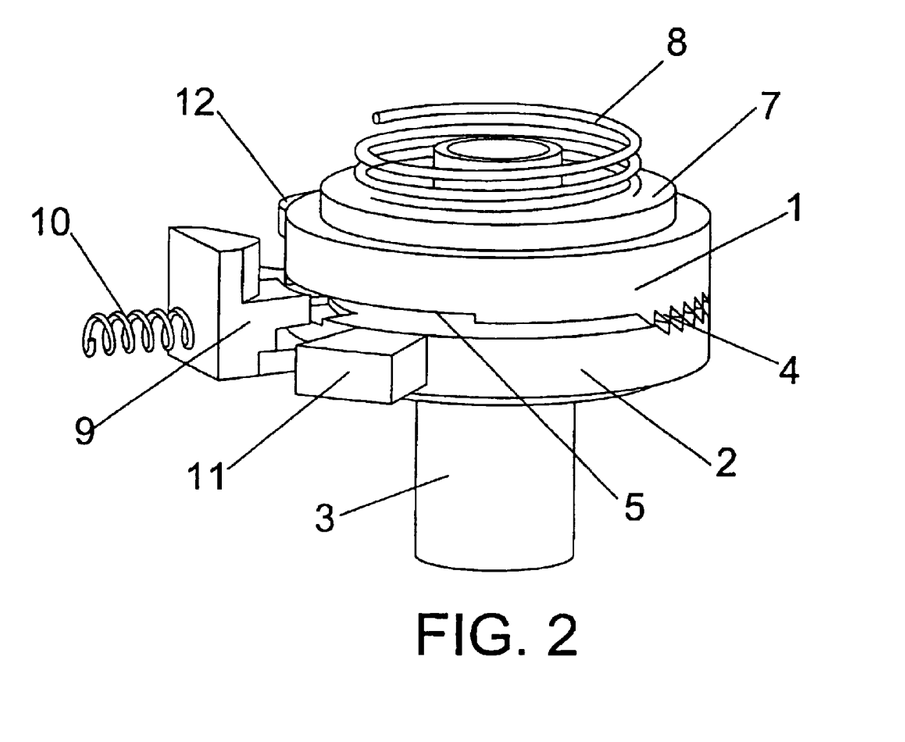
FIG. 2.—Shows a general perspective of the mechanism with all the parts properly mounted and with the part acting as ratchet slightly separated with respect to the part acting as crown, although the separator is not interposed between both parts.
Figure 3:
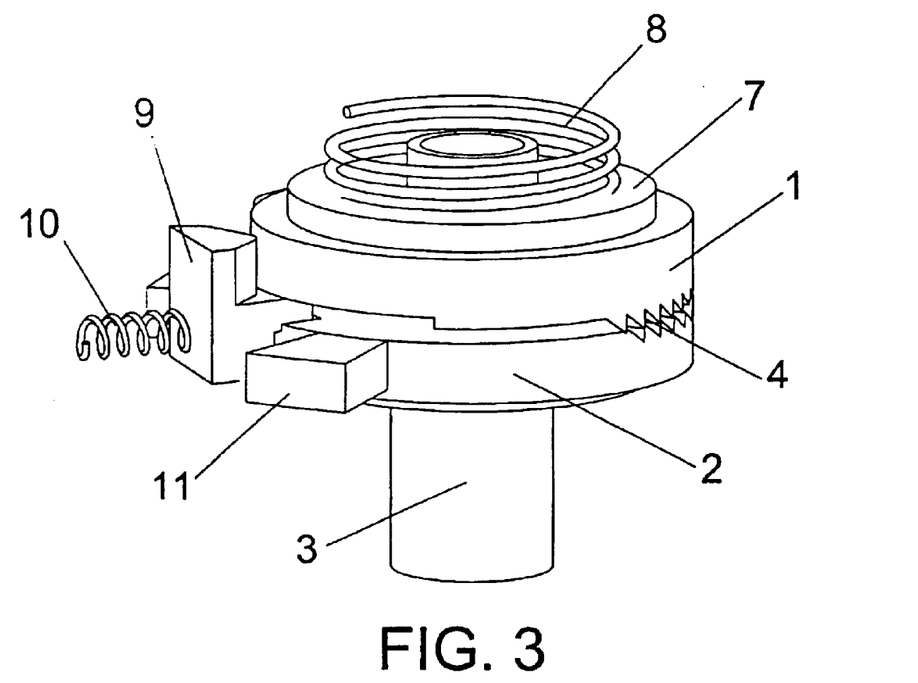
FIG. 3.—Shows a perspective view like the previous figure, maintaining the separation between the constituent parts of the ratchet and of the crown, with the separator now interposed between them.
Figure 4:
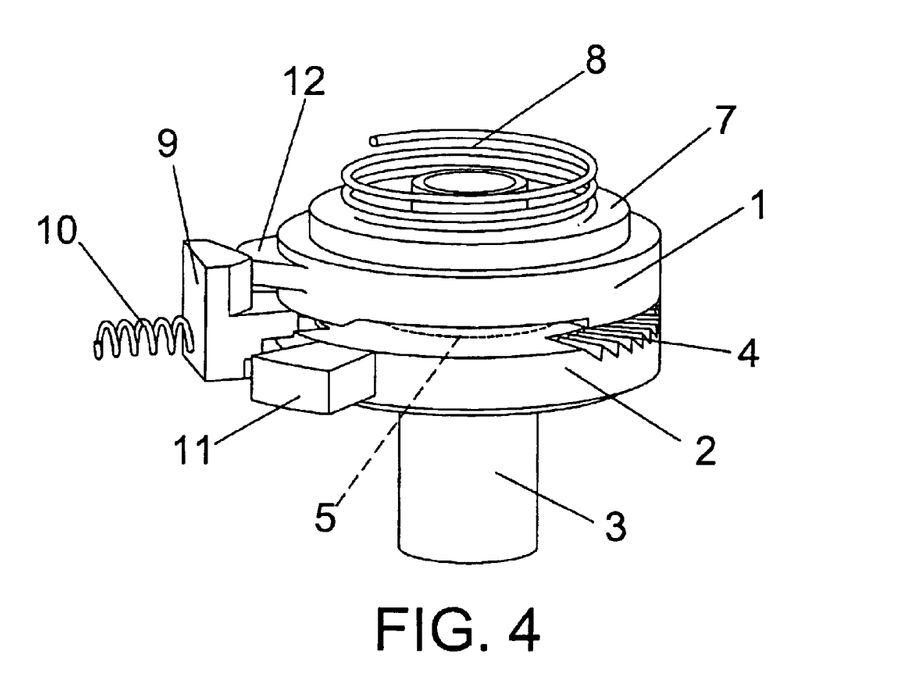
FIG. 4.—Shows another perspective view of the same mechanism in a position in which the ratchet is carrying out the expulsion of the separator, to permit the ratchet to again reach the position of engaging with the crown.
Figure 5:
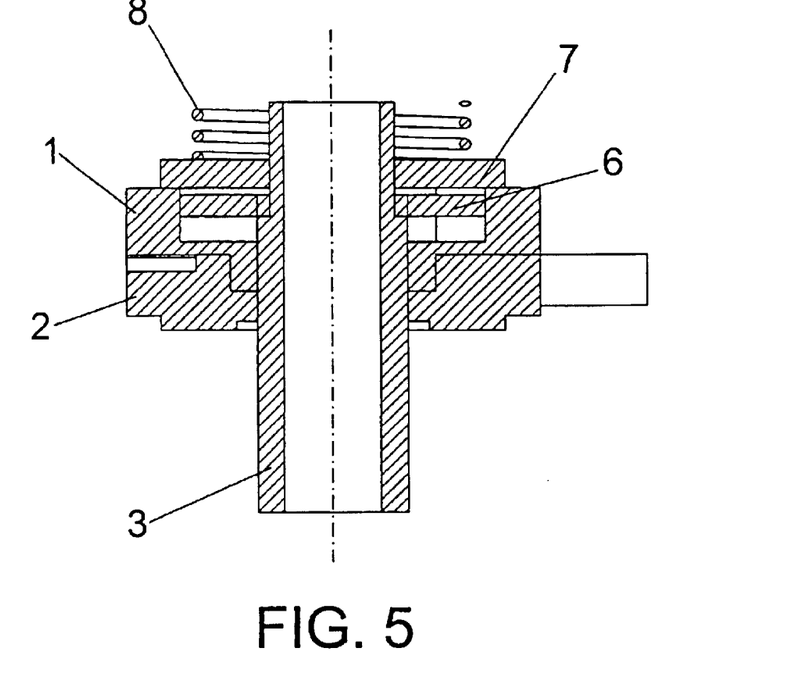
FIG. 5.—Shows a section view of the mechanism depicted in the previous figures, where the ratchet is engaging with the crown.
Figure 6:
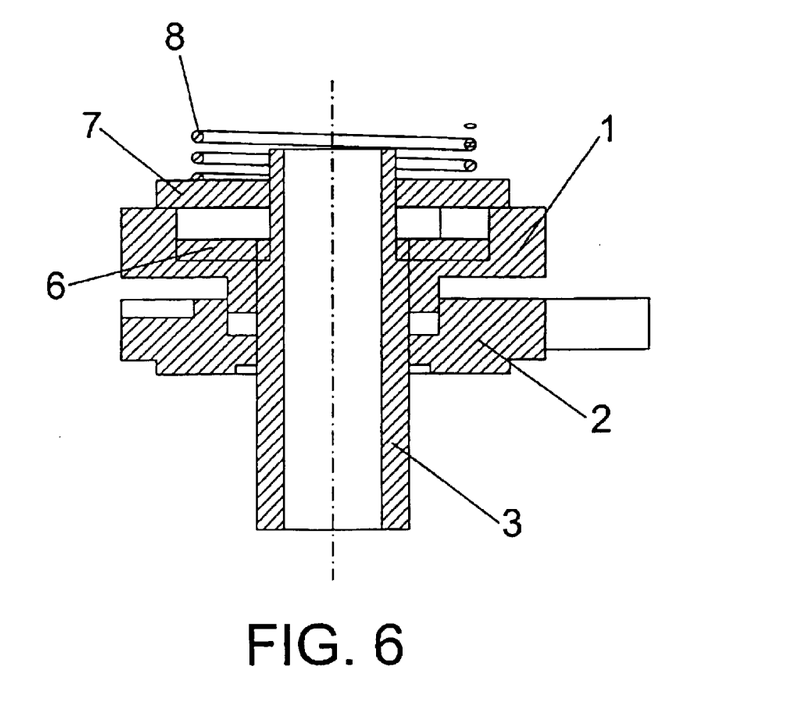
FIG. 6.—Shows another section view like the previous figure but with the ratchet separated from the crown, that is to say mutually disengaged to allow the resetting of the mechanism.

Finally, regarding this way of operation depicted in FIGS. 1 to 6, it should be said that above the crown (2) a side protuberance 11 has been planned serving as a limit, while on the ratchet (1) an arched protrusion 12 has been planned like a nose that in the rotation of this ratchet (1) pushes the separator outwards (9), as depicted in FIG. 4, a push that causes the outwards displacement of this separator (9) and therefore that the ratchet (1) and crown (2) re-engage again.

Figure 7:
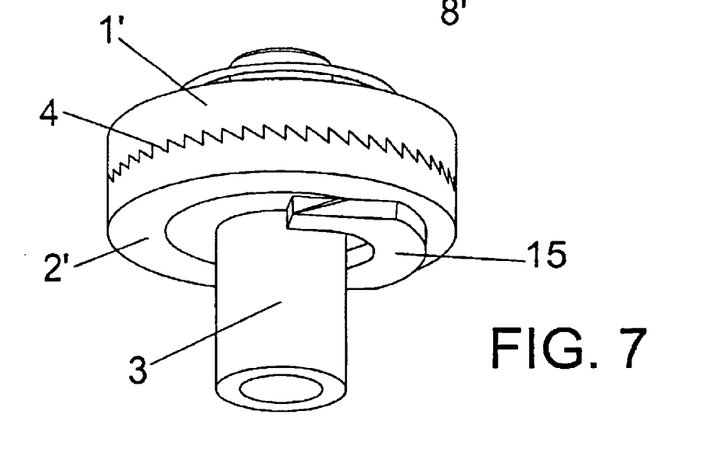
FIG. 7.—Shows a perspective view of the mechanism in an alternative operation in which the separator is activated manually from the outside.
Figure 8:
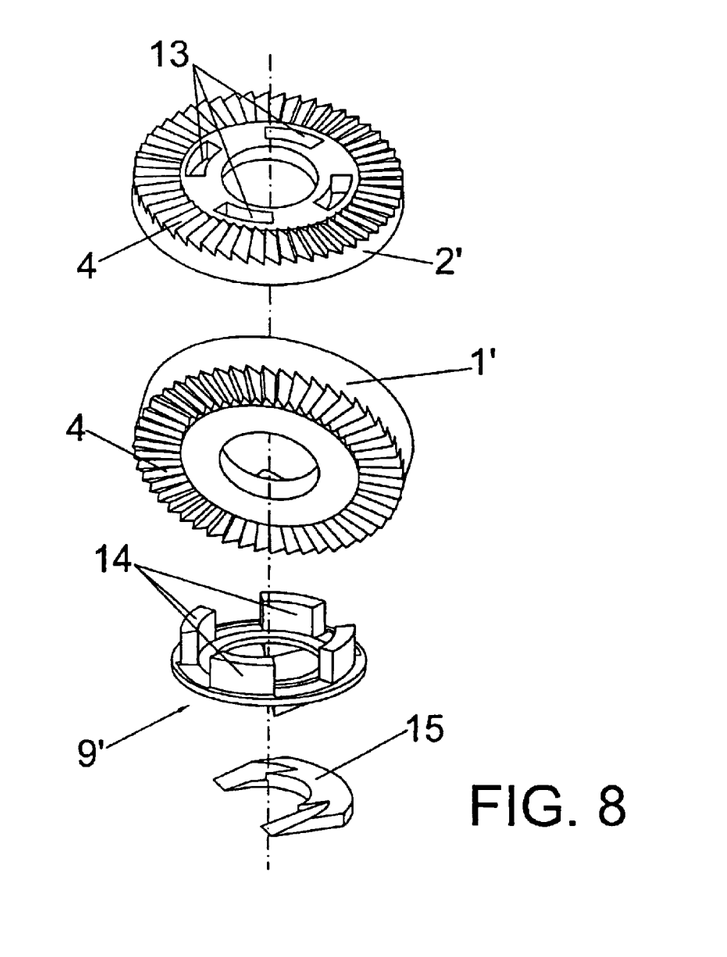
FIG. 8.—Shows a blow-up of the crown, ratchet, separator and manual operation element, corresponding to the alternative operation of the mechanism depicted in the previous figure.
Figure 9:
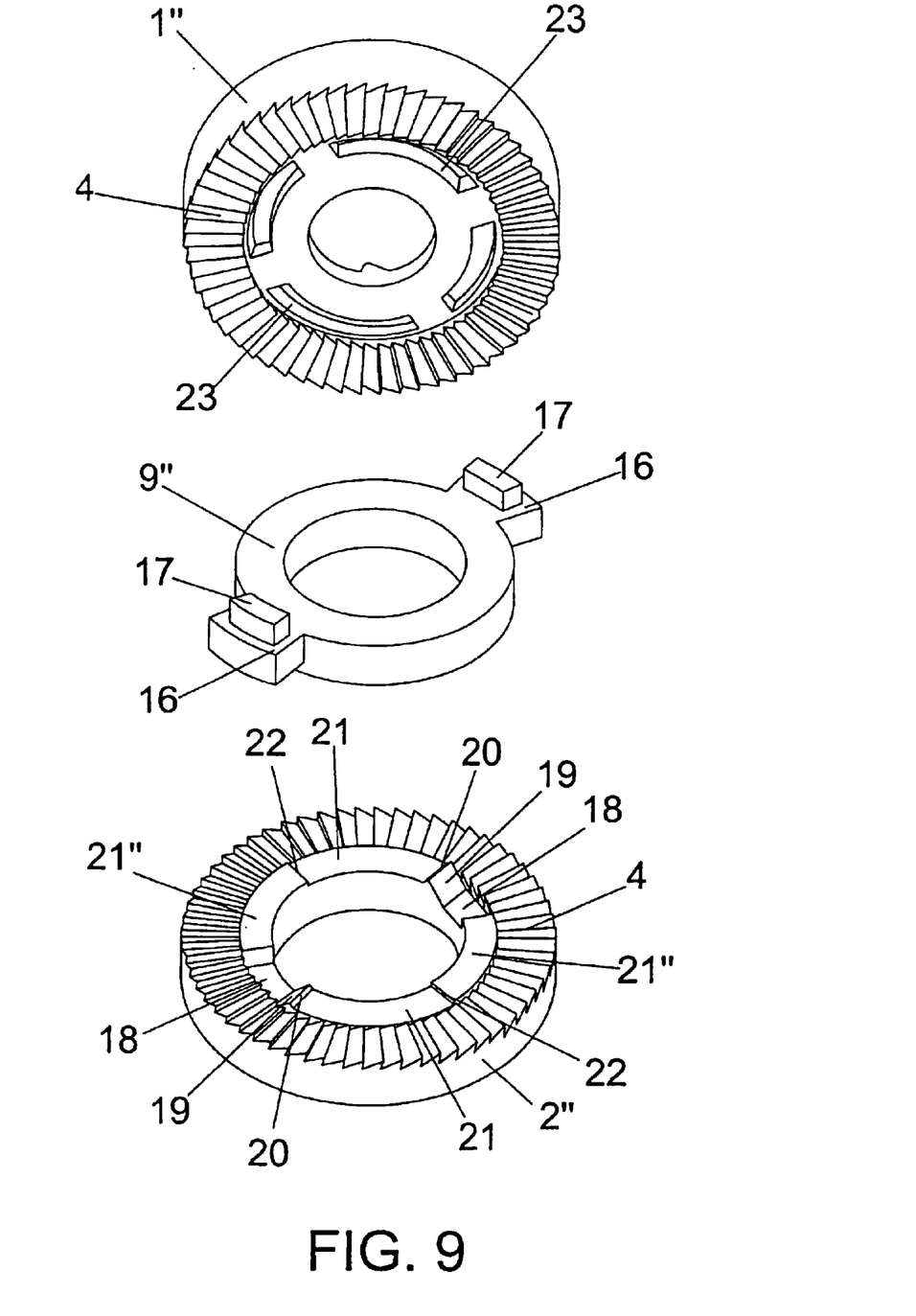
FIG. 9.—Shows a blow-up of the crown, ratchet and separator in another alternative of operation of the mechanism.

In a variant of operation depicted in FIGS. 7 and 8, the ratchet (1') and the crown (2'), are cogged (4') around the whole perimeter, being similarly mounted on the corresponding axle (3), so that in this case a new separator (9') is included formed from a type of a ring with some projections (14) that are housed in windows (13) set up for this purpose in the crown (2'), so that by using a control (15) a type of wedge operable from the outside can act on this separator (9'), producing its axial displacement that in turn pushes on the ratchet, also in an axial sense, and causes its separation from the crown (2') and therefore its disengagement or uncoupling and allows the resetting as previously described.

In another variant of operation shown in FIGS. 9 to 15 the ratchet (1") and the crown (2") have corresponding cogs on all of their perimeters (4), while the separator (9") is formed by a ring with a pair of arms or external side fins (16) in diametrical opposition, each one of which has a projection (17).

For its part, the crown (2") in its cogged face (4) and concentrically with it has a pair of housings (18) complementary to the arms (16), with the purpose that these latter lodge in these housings (18), which have one of their walls (19) ramped that ends, after a small sharp rise (20), in a flat section (21) with a step (22) from which another flat section is set out (21") at a higher or more projecting level with respect to the plane (21) previously referred to.

In its case, the ratchet (1") has in its lower face and concentrically with the cogs (4) some grooves or slots (23) placed circumferentially, in which the projections (17) of the arms (16) of the separator (9") are positioned, so that the rotation of this ratchet (1") can be carried out without dragging the separator (9"), until when the projections (17) are limited against one of the ends of the grooves or slots (23) in which moment the separator is dragged (9") whose projections (17) slide along the ramped walls (19) of the crown (2") housings (18) until reaching the level (21) of the crown (2").

Figure 10:
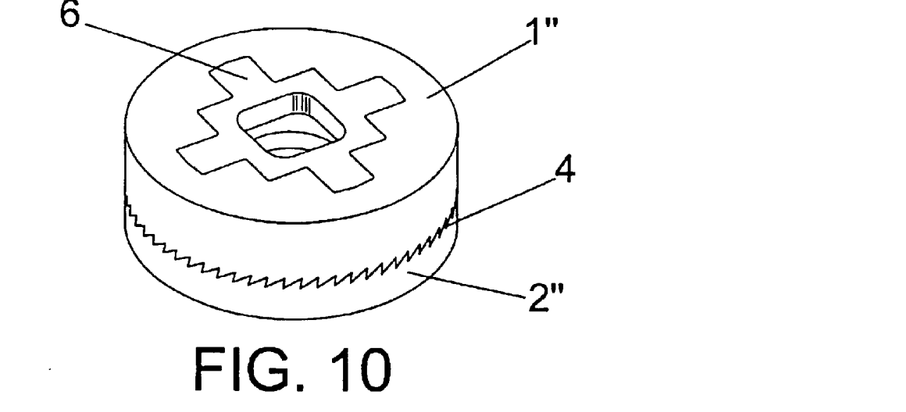
FIG. 10.—Shows an upper view of the assembly that the three parts depicted in the previous figure make up when positioned.
Figure 10A:
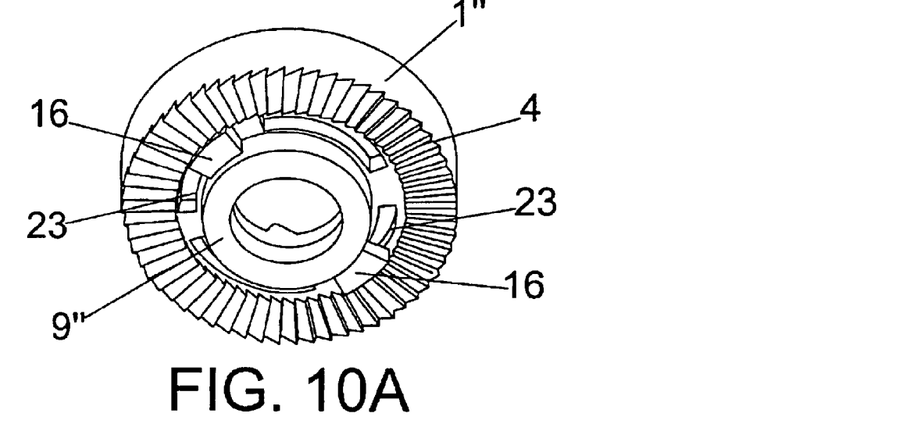
FIG. 10A.—Shows a lower perspective view of the constituent part of the ratchet with the separator mounted on it.
Figure 10B:
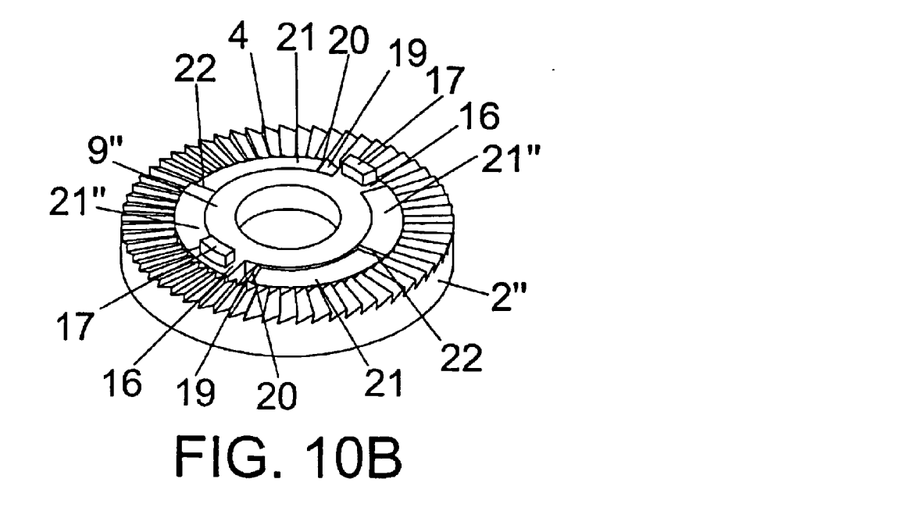
FIG. 10B.—Shows an upper perspective view of the constituent part of the crown with the separator mounted on it.

In accordance with these characteristics, the working of the mechanism corresponding to the operation shown in FIGS. 9 to 15 is as follows:

In the initial position of the mechanism depicted in FIGS. 10, 10A and 10B, the separator (9") is positioned in the crown (2"), with its fins (16) in the housings (18) of this crown, meanwhile the projections (17) of this separator (9") are housed in the grooves or slots (23) of the ratchet (1"), this position corresponding to the engaging of the ratchet (1") and crown (2"), all as consequence of the force of the spring that keeps them pushed together by means of the cross-shaped disk (6) and the support disk (7) that although not shown in FIGS. 9 to 15 they are included as in the operations depicted in FIGS. 1 to 8.

Figure 11:
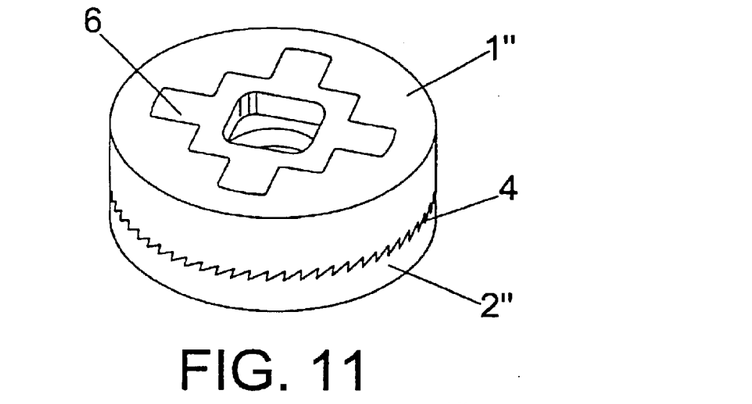
FIGS. 11, 11A and 11B.—Show some other views like those of FIGS. 10, 10A and 10B, in a final adjustment position of the mechanism.
Figure 11A:
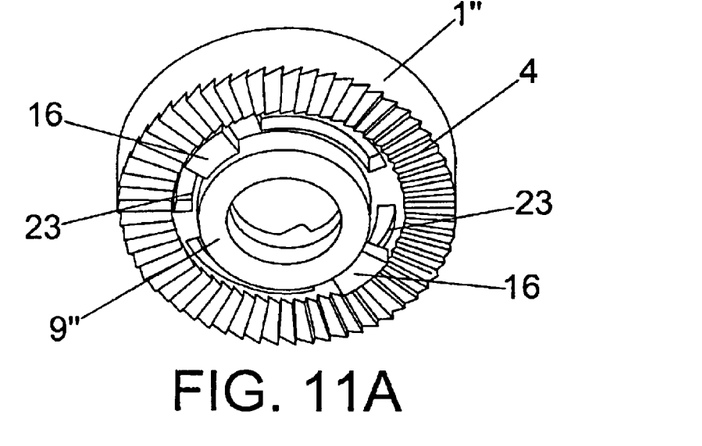
Figure 11B:
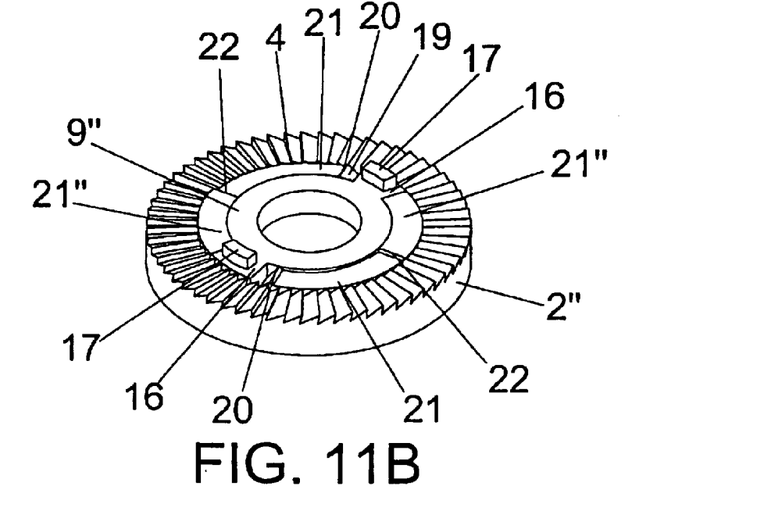

From this initial position, to achieve an adjustment, as depicted in FIGS. 11, 11a and 11b the movable or hinged item is acted on in the sense of its folding, causing the rotation of the ratchet (1") that moves over the crown (2"), jumping tooth to tooth and thus passing through multiple positions of stable adjustment, so that when the shifting of the movable or hinged item finishes, it will remain in a fixed and stable position of adjustment, with respect to the fixed item or structure.

During the movement of the ratchet (1") in this adjustment phase, the separator (9") remains immobile, as well as the crown (2"), since the ratchet rotates but, the slots (23) being of greater angular length than the projections (17) of the separator (9"), the slots (23) move over the projections (17) without these being affected by such movement.

Figure 12:
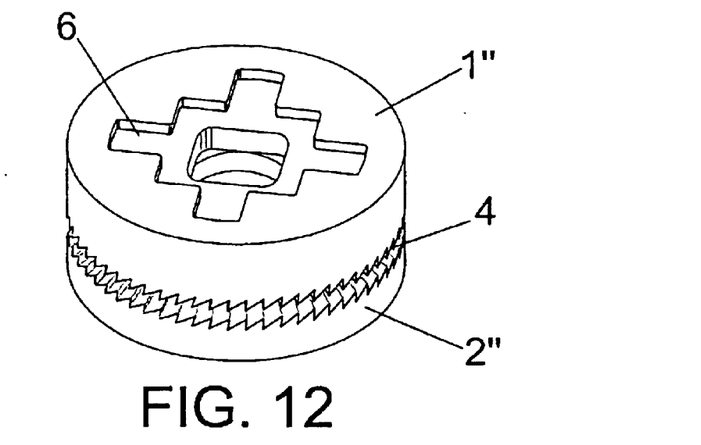
FIGS. 12, 12A and 12B.—Show some other views of the same mechanism depicted in the figures of the previous paragraph, in an initial phase of operation in which the separator is acting to disengage the ratchet and the crown.
Figure 12A:
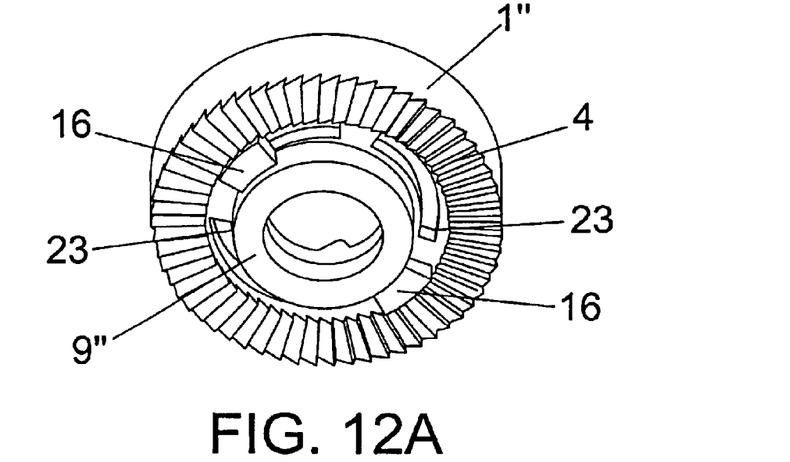
Figure 12B:
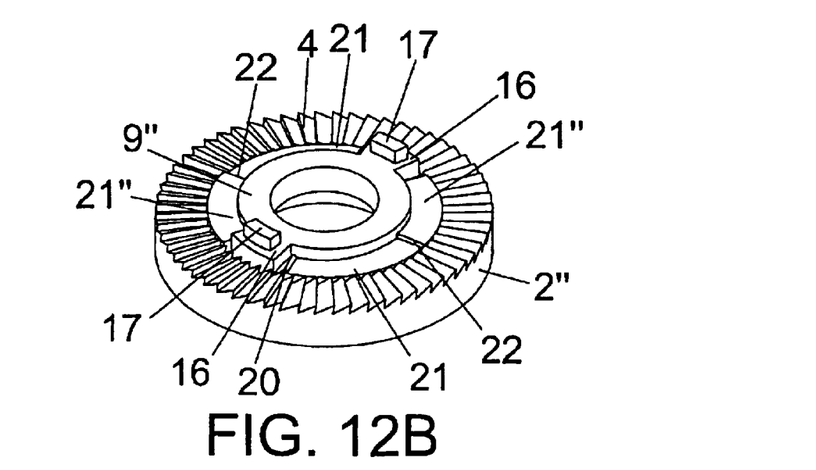

To be able to pass from a more folded position to a less folded position, the operation is as follows:

At first, the movable or hinged item should be brought to the position of maximum adjustment or maximum folding that is depicted in FIGS. 11, 11A and 11B, that is the final adjustment position, then from this position the movable item continues to be acted on so that the ratchet (1") continues rotating dragging the separator (9") as a consequence of which its projections (17) reach a limit against the ends of the grooves or slots (23) of the ratchet (1"), a dragging that causes the arms (16) as has been said previously, to slide along the ramped walls (19) of the crown (2"), the angular displacement of the separator (9") taking place and its elevation over the flat section (21) of the crown (2"), bring about the axial push of the ratchet (1") causing this to be separated form the crown (2") and producing the uncoupling or disengagement of the teeth (4) of both parts, this uncoupling phase corresponding to that which is shown in FIGS. 12, 12A and 12B.

Once the separator (9") has reached the forementioned flat section (21) of the crown (2"), if the movable or hinged item continues to be acted on, this separator (9") can continue rotating until it abuts against the step (22) of the crown (2"), this situation corresponding to an area of free adjustment whose purpose is that the working position of the separator (9") doesn't correspond with a single point or position of the movable or hinged item that coincides with the most extreme position of that movable item, but once having reached the point of activation of the separator (9") it is possible to fold a little more the movable hinged item so that the operability might be more convenient for the user.

Figure 13:
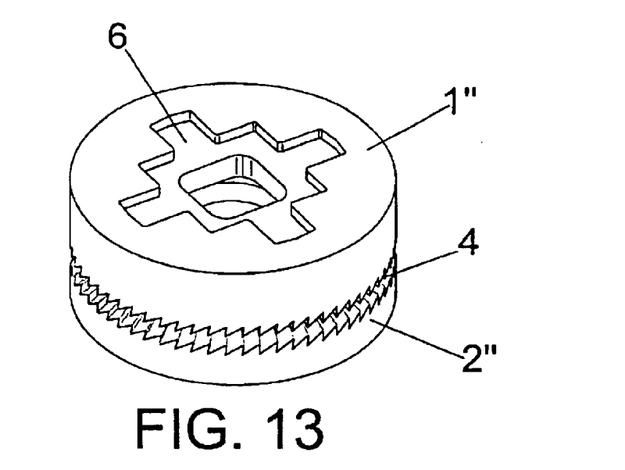
FIGS. 13, 13A and 13B relate equally to some other views similar to those of the assemblies depicted in the previous figures, in a phase of operation of the separator that corresponds to that of complete disengagement of the ratchet and the crown.
Figure 13A:
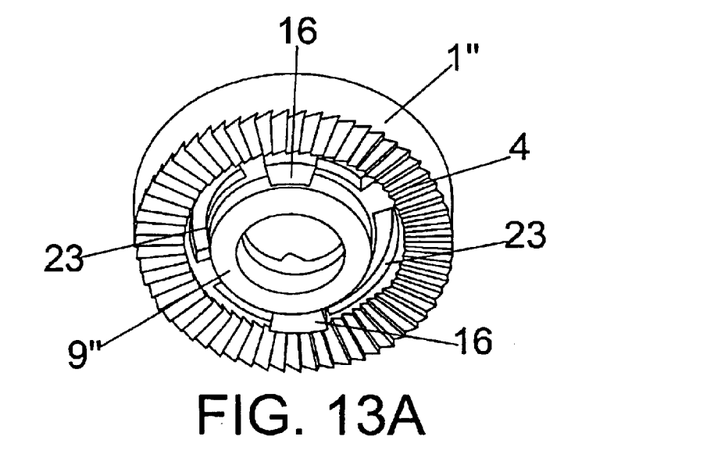
Figure 13B:
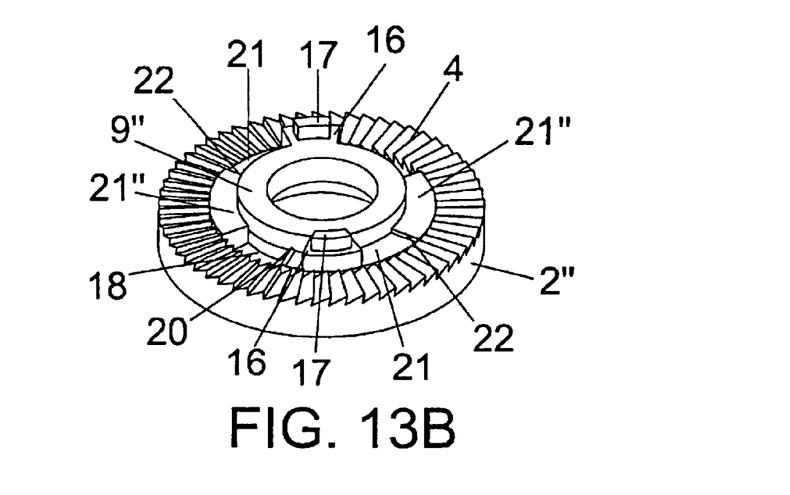
Figure 14:
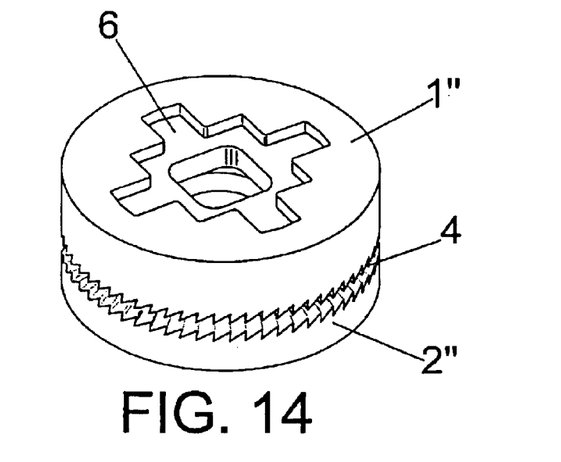
FIGS. 14, 14A and 14B relate to some other views like those of the previous sets in an initial phase of resetting of the mechanism.
Figure 14A:
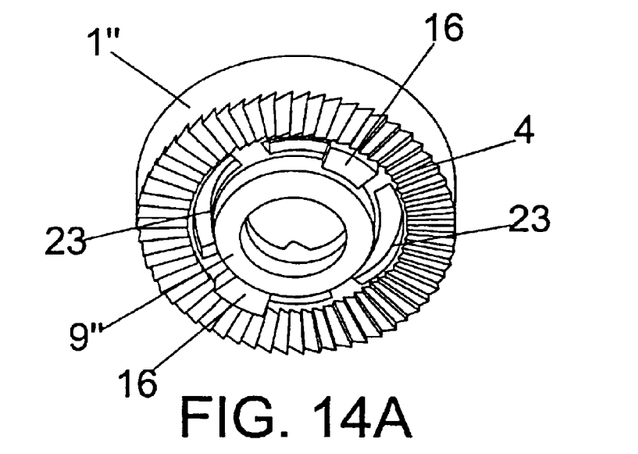
Figure 14B:
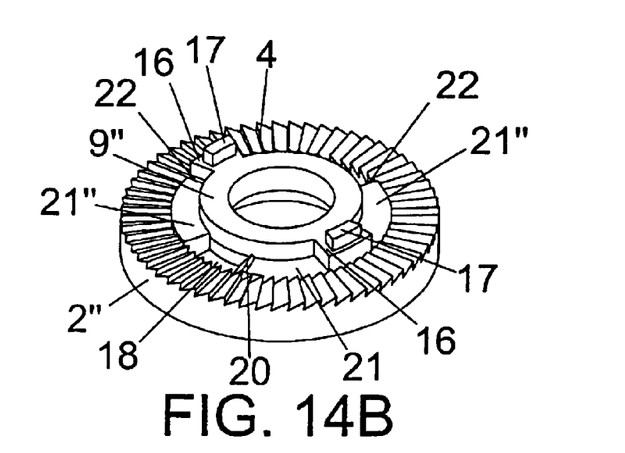
Figure 15:
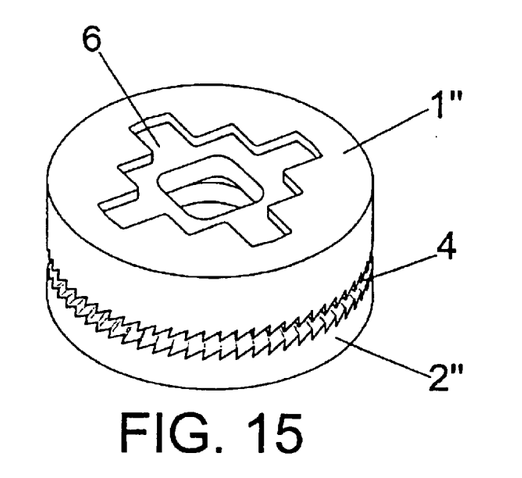
FIGS. 15, 15A and 15B.—Show, finally, some other views like those of the previous sets corresponding to the final resetting of the mechanism, or, what is the same, to the coupling or engaging of the ratchet and crown.
Figure 15A:
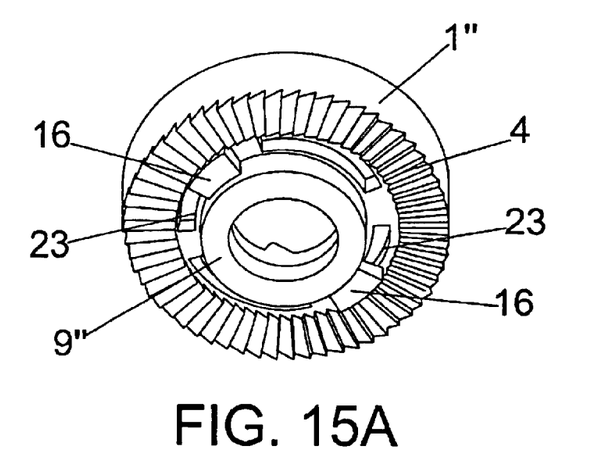
Figure 15B:
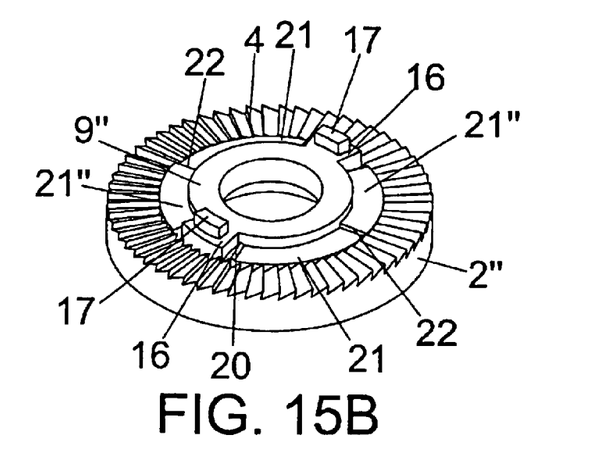

Starting from the position corresponding to that of free adjustment depicted in FIGS. 13, 13A and 13B, and having reached the upper limit of free adjustment depicted in FIGS. 14, 14A and 14B, then the resetting phase of the mechanism is executed, from precisely this position depicted in the last figures referred to, so that from this position the movable item is unfolded, that is the movement in a contrary sense, until reaching the initial position, an unfolding that will initially cause the rotation, in contrary sense, of the ratchet (1") without producing any effect until the edges of its grooves or slots (23) contact with the arms (16) of the separator (9") and begin to push and drag this part, which is shown in FIGS. 15, 15A and 15B.

During this phase the arms (16) of the separator (9") slide over the step (22) of the crown (2") until reaching the housings (18) of this crown, when this separator (9") as well as rotating, dragged by the ratchet (1"), starts its axial descending movement until becoming fully positioned by its arms (16) in the housings (18) of the crown (2"). At this time, the ratchet (1") by the force of the spring not shown in these drawings, again engages the crown (2") by which the resetting of the mechanism will have been achieved.

As regards the small elevation (20) planned in the upper part of the ramped wall (19) corresponding to the housings (18) of the crown (2"), this acts during the resetting phase of the mechanism and its purpose is to counteract the effect of the friction that could exist between the ratchet (1") and the separator (9"), a friction that could cause the ratchet (1") to drag the separator (9") during the initial resetting phase, in which the ratchet rotates but doesn't drag this separator (9"). This movement due to friction of the separator (9") could cause an imbalance between the position that it should occupy and the one that it really occupies, being able to reach the ramped wall (19) of the crown (2") well before reaching the initial position of the mechanism, causing the engaging of the ratchet (1") and the crown (2") before time. That is that the purpose of the small elevation (20) is to retain the separator (9") when this moves due to the effect of friction alone, preventing it from descending along the ramped wall (19), so that this separator (9") will continue to wait for the rotation of the ratchet (1") is reached and that it is this push that obliges it to surmount the forementioned small elevation (20), thus achieving a readjustment of the relative positions of both parts.

What is claimed is:

1. Mechanism for adjustment of hinged elements that planned to be applicable in the angular adjustment of a movable or hinged item with respect to a fixed structure or item, such as could be the armrests or a car, distinctive because the mechanism is essentially formed by two discordal parts mounted on a common axle, the parts each being equipped with opposing cogs that tend to engage permanently with each other; being intended that the discoidal part acts as a crown and is jointed to a structure or fixed item in which it is applied, while the discoidal part acts as a ratchet and is positioned on the axle with ability to move axially, between limits set by a limit plate positioned on the axle and an external limit disk that in turn forms a support for a spring that tends to continuously push the discoidal part acting as a ratchet against the discoidal part acting as a crown; furthermore with the distinction that between the ratchet and crown a controlling part of a separator with an external control member for manual operation operable from outside the mechanism wherein the external control member directly engages the separator to allow the disengaging of the cogs of the ratchet and crown to permit a tilting of the hinged part in an opposite sense to folding.

2. Mechanism of adjustment of hinged elements, according to claim 1, wherein the cogs of the ratchet and crown are located on a sector of a perimeter of a set of opposing faces of both parts.

3. Mechanism of adjustment of hinged elements, according to claim 1, wherein the discoidal part, that act as a ratchet, can be mounted on the fixed item and the discoidal part, that acts as crown, can be mounted on the hinged item.

4. Mechanism for adjustment of hinged elements that planned to be applicable in the angular adjustment of a movable or hinged item with respect to a fixed structure or item, such as could be the armrests or a car, distinctive because the mechanism is essentially formed by two discordal parts mounted on a common axle, the parts each being equipped with opposing cogs that tend to engage permanently with each other; being intended that the discoidal part acts as a crown and is jointed to a structure or fixed item in which it is applied, while the discoidal part acts as a ratchet and is positioned on the axle with ability to move axially, between limits set by a limit plate positioned on the axle and an external limit disk that in turn forms a support for a spring that tends to continuously push the discoidal part acting as a ratchet against the discoidal part acting as a crown; furthermore with the distinction that between the ratchet and crown a controlling part of a separator that allows the disengaging of the cogs of the ratchet and crown to permit the tilting of the hinged part in the opposite sense to folding and wherein the ratchet and crown have cogs on all a perimeter of a set of opposing faces of these parts, while the separator is formed from a piece styled like a ring with projections that lodge in windows set up for this purpose in the crown, this separator being associated with an external control in the shape of a wedge of manual operation.

* * * * *